(12) United States Patent
Stander

(10) Patent No.: US 7,681,687 B2
(45) Date of Patent: Mar. 23, 2010

(54) CONTROL CONSOLE HAVING MULTIPLE USE POSITIONS

(75) Inventor: Martin R. Stander, Greencastle, PA (US)

(73) Assignee: Manitowoc Crane Companies, Inc., Reno, NV (US)

(*) Notice: Subject to any disclaimer, the term of this patent is extended or adjusted under 35 U.S.C. 154(b) by 402 days.

(21) Appl. No.: 11/730,371

(22) Filed: Mar. 30, 2007

(65) Prior Publication Data

US 2008/0238120 A1    Oct. 2, 2008

(51) Int. Cl.
*B60K 26/00* (2006.01)

(52) U.S. Cl. ............... 180/334; 180/326; 297/411.3; 297/411.35

(58) Field of Classification Search ........... 280/326, 280/333, 334, 315, 323, 336; 74/471 XY; 297/411.3, 411.31, 411.32, 411.35, 411.36, 297/411.37; 180/326, 333, 334, 315, 323, 180/336
See application file for complete search history.

(56) References Cited

U.S. PATENT DOCUMENTS

| | | | |
|---|---|---|---|
| 3,085,644 A | 4/1963 | Van Der Lely | |
| 3,223,193 A | 12/1965 | Reynolds et al. | |
| 3,893,346 A * | 7/1975 | Paul | 74/471 R |
| 4,140,200 A * | 2/1979 | Tucek | 180/333 |
| 4,165,901 A * | 8/1979 | Swenson et al. | 297/411.33 |
| 4,244,623 A * | 1/1981 | Hall et al. | 297/411.36 |
| 4,307,913 A * | 12/1981 | Spiegelhoff | 297/411.33 |
| 4,478,308 A * | 10/1984 | Klaassen | 180/326 |
| 4,580,647 A | 4/1986 | Peifer et al. | |
| 4,646,869 A | 3/1987 | Kerner, Jr. | |
| 5,038,887 A | 8/1991 | Sousek | |
| 5,127,699 A | 7/1992 | Maezawa et al. | |
| 5,520,258 A | 5/1996 | Kemshall | |
| 5,617,929 A | 4/1997 | Richardson et al. | |
| 5,647,577 A | 7/1997 | Feldman et al. | |
| 5,924,515 A | 7/1999 | Stauffer | |
| 6,089,353 A | 7/2000 | Bartels et al. | |
| 6,148,688 A | 11/2000 | Nishimaki | |
| 6,164,285 A | 12/2000 | Garberg et al. | |
| H2024 H | 6/2002 | Kelley et al. | |
| 6,564,896 B1 | 5/2003 | Proksch et al. | |
| 6,904,995 B2 * | 6/2005 | Dinkel et al. | 180/334 |
| 6,971,194 B2 * | 12/2005 | McClelland et al. | 37/347 |
| 7,014,255 B2 * | 3/2006 | Amamiya et al. | 296/190.08 |
| 7,036,250 B2 * | 5/2006 | Dressler et al. | 37/466 |
| 7,150,497 B1 | 12/2006 | Smith et al. | |
| 2005/0045409 A1 | 3/2005 | Fenelli et al. | |

* cited by examiner

*Primary Examiner*—Paul N Dickson
*Assistant Examiner*—Drew Brown
(74) *Attorney, Agent, or Firm*—Birch, Stewart, Kolasch & Birch LLP

(57) ABSTRACT

A control console includes a body supporting a plurality of controls, a base, and first and second legs each having a first end pivotably connected to the body and a second end pivotably connected to the base. The legs are shiftable between a first position projecting over a first end of the base, a second position projecting over a second end of the base and a third position between the first and second positions. At least one spring is provided to bias the legs toward the third position, and a motor may included for shifting the legs.

19 Claims, 6 Drawing Sheets

CONTROL CONSOLE HAVING MULTIPLE USE POSITIONS

FIELD OF THE INVENTION

The present invention is directed to a movable control console, and more specifically, toward a movable control console having a body connected to a base by first and second legs pivotably connected to both the body and the base.

BACKGROUND OF THE INVENTION

Truck-mounted lifting devices, such as cranes, may be controlled from outside a vehicle cab using a control console mounted on the truck body. Such cranes often have a rotatable base and may be used to lift objects in front of, behind, or on either side of the truck. However, an operator standing at a control console mounted on one side of the truck, for example, may have difficulty observing the operation of the crane when it is used to lift an object on the opposite side of the truck. Multiple control consoles can be provided, but this increases the cost and complexity of the truck-mounted lifting device. It would therefore be desirable to provide a control console for a lifting device such as a truck-mounted crane, that can be moved as needed based on operator preference and on the job being performed by the crane.

SUMMARY OF THE INVENTION

These problems and others are addressed by embodiments of the present invention, a first aspect of which comprises a control console that includes a body supporting a plurality of controls, a base, and first and second legs each having a first end pivotably connected to the body and a second end pivotably connected to the base. The legs are shiftable between a first position projecting over a first end of the base, a second position projecting over a second end of the base and a third position between the first and second positions. At least one spring is provided to bias the legs toward the third position.

Another aspect of the invention comprises a control console having a body supporting a plurality of controls, a base, and first and second legs pivotably connected to the body and the base. The legs are shiftable between a first position projecting over a first end of the base, a second position projecting over a second end of the base and a third position between the first and second positions. A powered actuator is operably connected to the first leg for shifting the legs among the first, second and third positions.

An additional aspect of the present invention comprises a control console having a body supporting a plurality of controls, a base having first and second ends, and first and second legs connected between the body and base. The base has a first portion pivotably mounted on a second portion for pivotable movement about a base pivot axis. The first leg has a first end pivotably connected to the body and a second end pivotably connected to the base so that the second end pivots about a first leg pivot axis perpendicular to the base pivot axis. The second leg has a first end pivotably connected to the body and a second end pivotably connected to the base so that the second end pivots about a second leg pivot axis perpendicular to the base pivot axis. The legs are shiftable between a first position projecting over a first end of the base, a second position projecting over a second end of the base and a third position between the first and second positions.

BRIEF DESCRIPTION OF THE DRAWINGS

These aspects and features of the invention and others will be better understood after a reading of the following detailed description together with the following drawings wherein.

DETAILED DESCRIPTION

Figure 1:
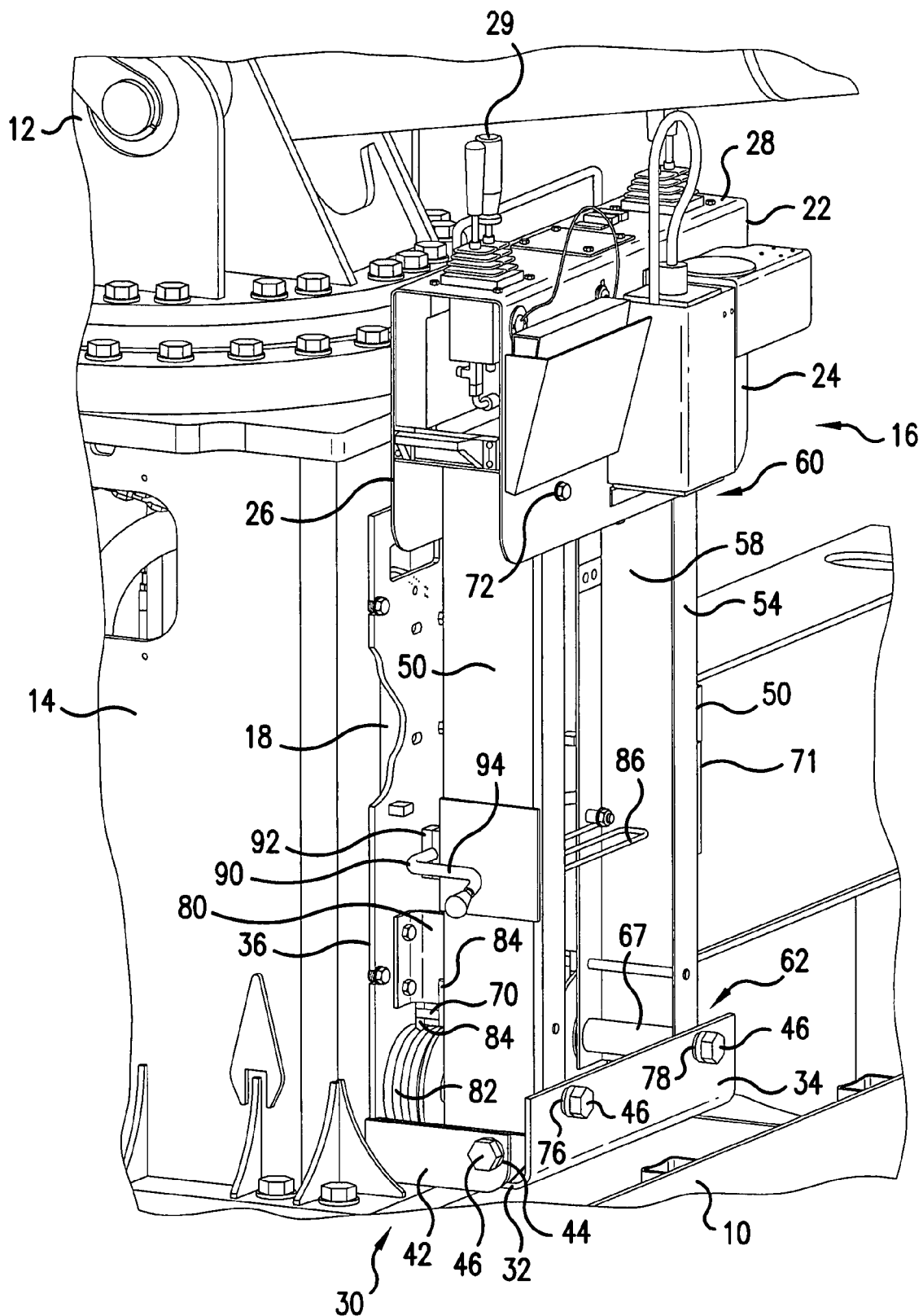
FIG. 1 is a front perspective view of a movable control console according to a first embodiment of the present invention mounted on the housing of a truck-mounted crane.
Figure 2:
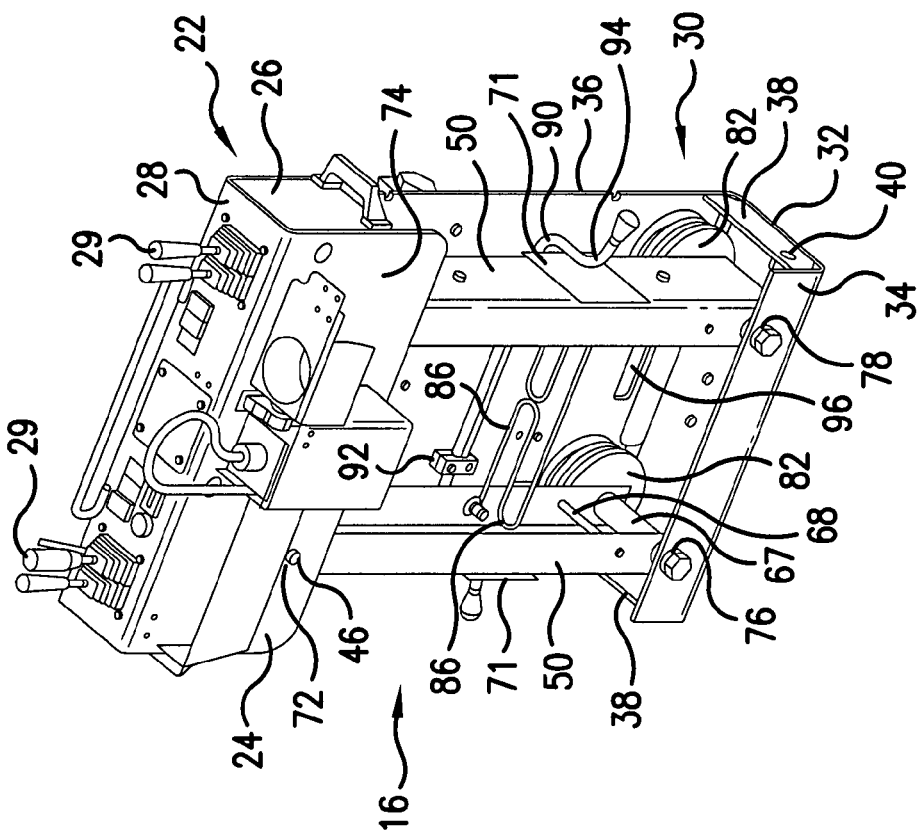
FIG. 2 is a front perspective view of the movable control console of FIG. 1.

Referring now to the drawings, wherein the showings are for purposes of illustrating embodiments of the invention only and not for the purpose of limiting same, FIG. 1 illustrates a truck 10 on which a crane 12 is mounted, a base portion of crane 12 (not illustrated) being enclosed within housing 14. A control console 16 is mounted along one wall of crane housing 14 over an opening 18 (illustrated in FIG. 9) in crane housing 14. Truck 10 further includes first and second operator supports 20 (FIG. 4) on which an operator may stand while operating crane 12 using console 16. Depending on the size of the crane, the operator may alternately stand on the ground on either side of the crane or on a differently configured platform. For purposes of description, the side of console 16 illustrated in FIGS. 1 and 2 may be referred to herein as the "front" of the console and the side of console 16 illustrated in FIG. 3, which faces toward crane housing 14, may be referred to herein as the "rear" of the console. In use, an operator will generally stand adjacent the rear of the console 16, and these relative descriptions are provided for ease of description only and not to limit the manner in which the movable console 16 is used.

While the present invention is useful for truck-mounted cranes, it may be used in other environments without departing from the scope of the present invention. For example, the console could be used on a fixed crane, or to operate a winch on a on a different type of vehicle such as a tow truck, or to control a vehicle such as a boat from first and second positions.

Figure 3:
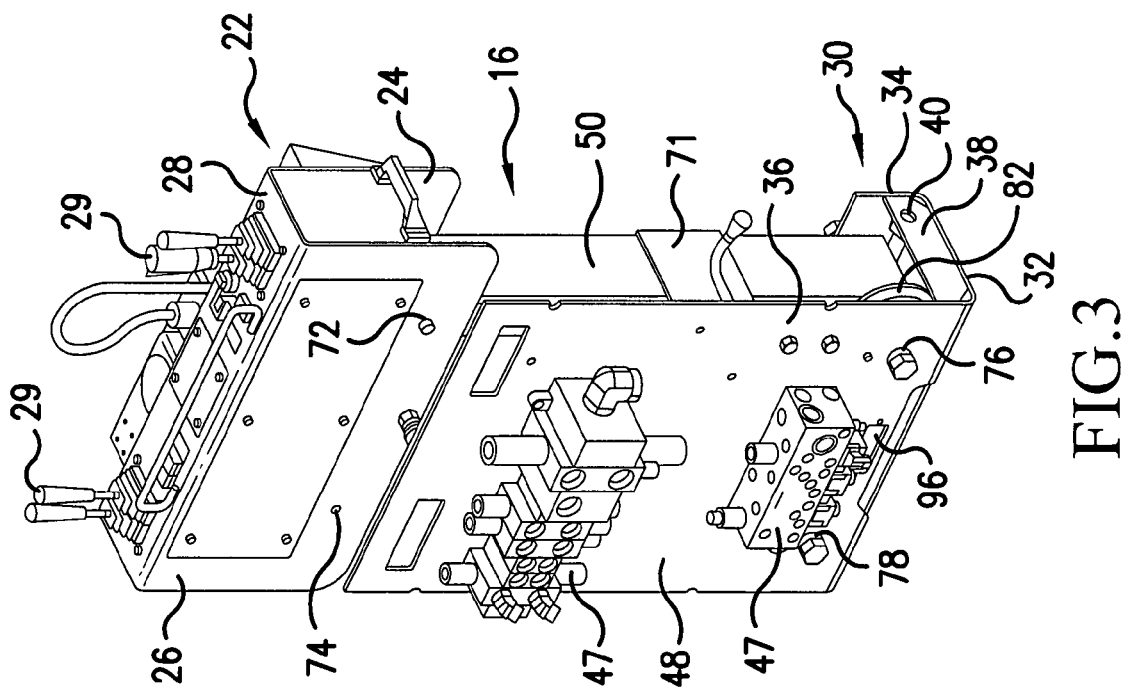
FIG. 3 is a rear perspective view of the movable control console of FIG. 1.

Console 16 includes a body 22 having a front wall 24, a rear wall 26 and a top wall 28 on which a plurality of controls 29 are mounted for controlling crane 12. Console 16 further includes a base member 30 having a bottom wall 32, a front wall 34 approximately perpendicular to bottom wall 32, a back panel 36 generally parallel to front wall 34 and projecting in the direction of body 22 and first and second side walls 38 each having an opening 40. A pair of base supports 42 are supported by housing 14 or truck 10, and each base support 42 includes an opening 44. Base member 30 is pivotably supported on base supports 42 by aligning openings 40 in side walls 38 with openings 44 on base supports 42 and passing bolts 46 or similar members through aligned openings 40 and 44 to form pivots. As illustrated in FIG. 3, various hydraulic and other connectors 47 are mounted on the rear side 48 of back panel 36. Base member 30 may be formed from separate elements welded or otherwise fastened together; alternately, a single sheet of material may be formed into a J-shape with the long portion of the J forming back panel 36, the bight of the J forming bottom wall 32, and the short portion of the J forming front wall 34.

Figure 4:
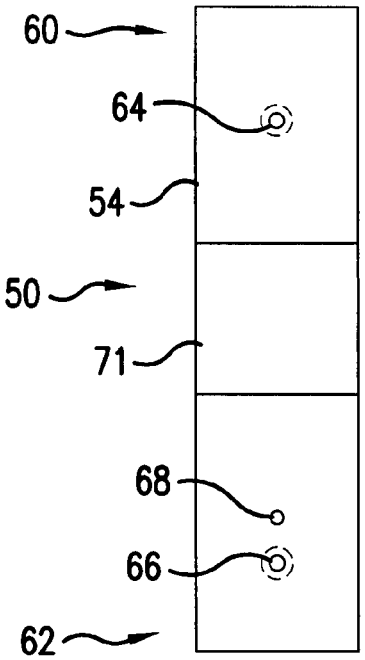
FIG. 4 is a front elevational view of one of the legs of the movable control console of FIG. 1.
Figure 5:
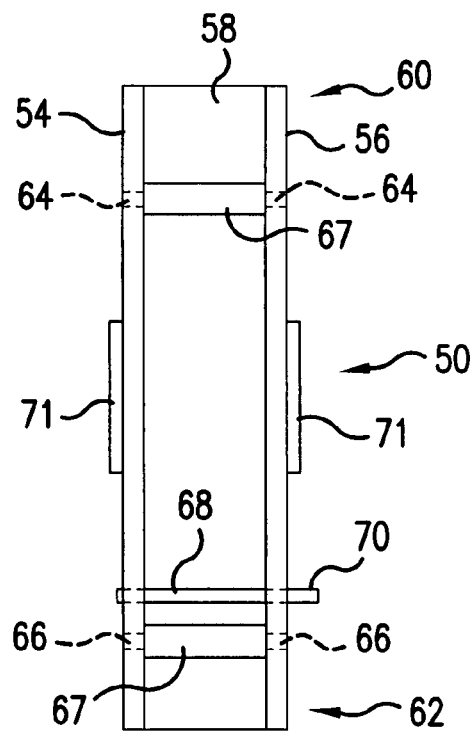
FIG. 5 is a side elevational view of the leg of FIG. 4.

Console body 22 is connected to base member 30 with first and second legs 50; one leg 50 is shown removed from the assembly of FIG. 1 in FIGS. 4 and 5. Each leg 50 comprises a C-shaped channel section having a front wall 54, a rear wall 56 and a side wall 58, and each leg has a first end 60 and a second end 62. Front wall 54 and rear wall 56 include a first pair of aligned openings 64 at first end 60 and a second pair of aligned openings 66 at second end 62. The aligned openings at the first and second ends 60, 62 of the legs 50 are connected by tubes 67. A pin 68 connects front wall 54 and rear wall 56 of each leg 50 near second pair of aligned openings 66 and extends past rear wall 56 to form a finger 70 projecting away from leg 50. Protective plates 71 are mounted on side walls 58 of legs 50 approximately halfway between first end 60 and second end 62.

First end 60 of one of legs 50 is pivotably connected to console body 22 by aligning openings 64 at first end 60 of leg 50 with a first pair of aligned openings 72 on in body front wall 24 and body rear wall 26 and passing bolts 46 through the aligned openings. The other leg 50 is attached to a second pair of aligned openings 74 in body front wall 24 and body rear wall 26 in a similar manner. The openings 66 at second end 62 of the first one of legs 50 are aligned with a pair of aligned openings 76 in base member front wall 32 and back panel 36 and pivotably connected thereto by a bolt 46. The other leg 50 is attached to a second pair of aligned openings 78 in the base member front wall 32 and back panel 36 in a similar manner. The legs 50 are mounted such that the open portions of the C-shaped channels face each other.

Rear panel 36 further includes first and second tabs 80 projecting normally from base member back panel 36 near bottom wall 32 and first and second coil springs 82 each having a pair of ends 84 are mounted on back panel 36 between tabs 80 and bottom wall 32. The springs may surround the bolts 46 passing through the aligned openings 74 and 76 in base member front wall 32 and back panel 36 and are mounted such that one end 84 of each spring 82 is located on a first side of one of the tabs 80 and the other end of that spring 82 is located on the opposite side of the tab 80 so that the tabs 80 limit the angular movement of springs 82 about the axis of bolt 46 supporting the adjacent portion of leg 50. Finger 70 on each leg 50 extends between the ends 84 of the springs 80.

A guide 86 for cable and/or conduit 88 is also connected between legs 50 and helps secure cable or conduit 88 when the console is operated as discussed hereafter. A crank arm 90 is mounted on rear panel 36 using brackets 92, includes first and second angled end portions 94, and can be shifted between a first position with angled end portions 94 generally parallel to back panel 36 and a second, locking position with angled end portions 94 projecting away from the back panel 36. A friction fit between crank arm 90 and brackets 92 holds crank arm 90 in these positions.

Figure 6:
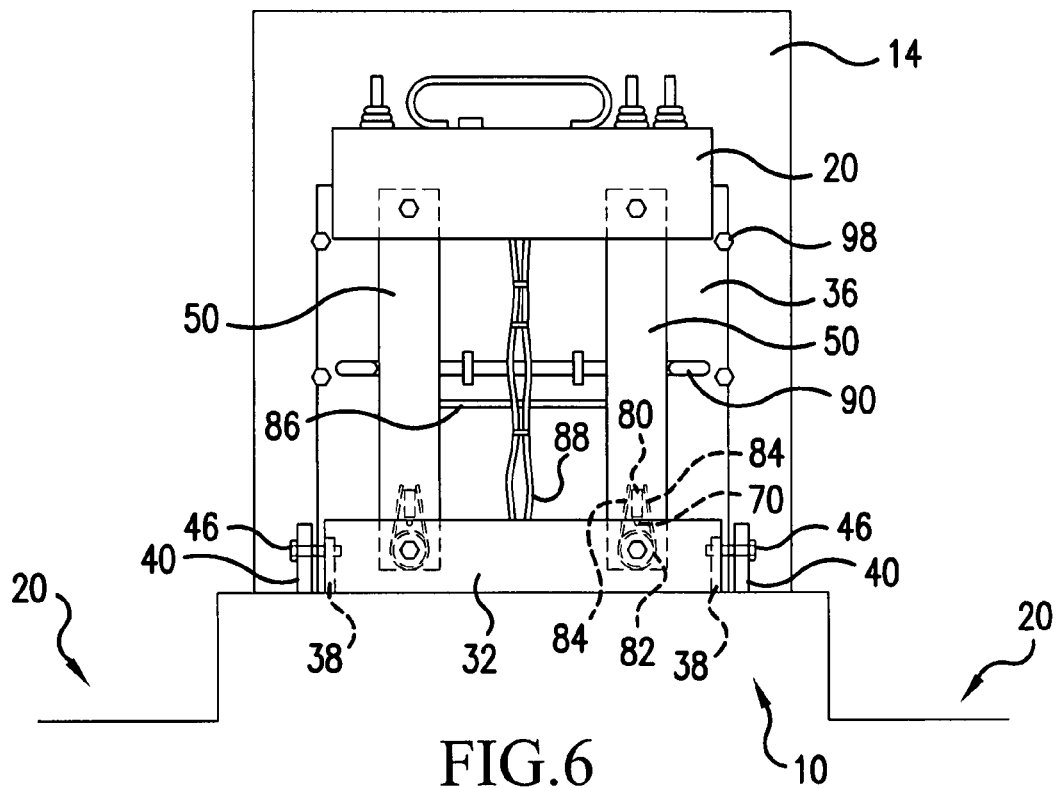
FIG. 6 is a front elevational view of the movable control console of FIG. 1 in a centered or storage position.
Figure 7:
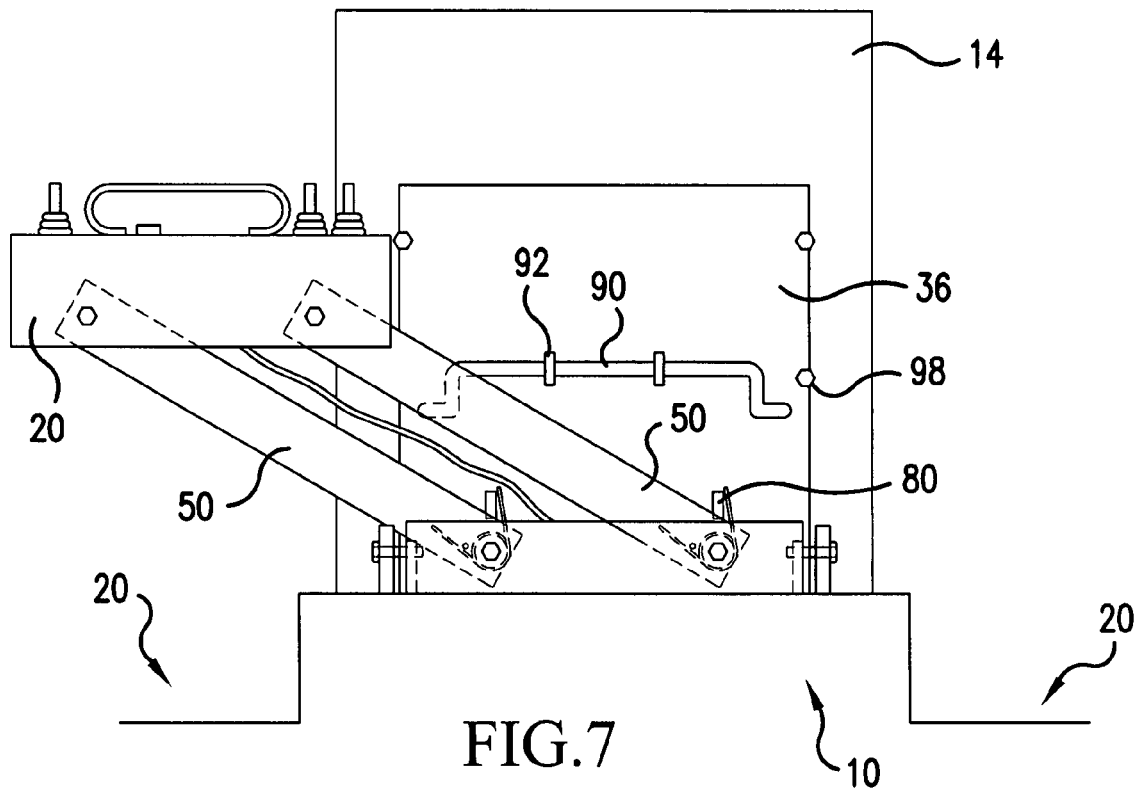
FIG. 7 is a front elevational view of the movable control console of FIG. 6 in a first use position.
Figure 8:
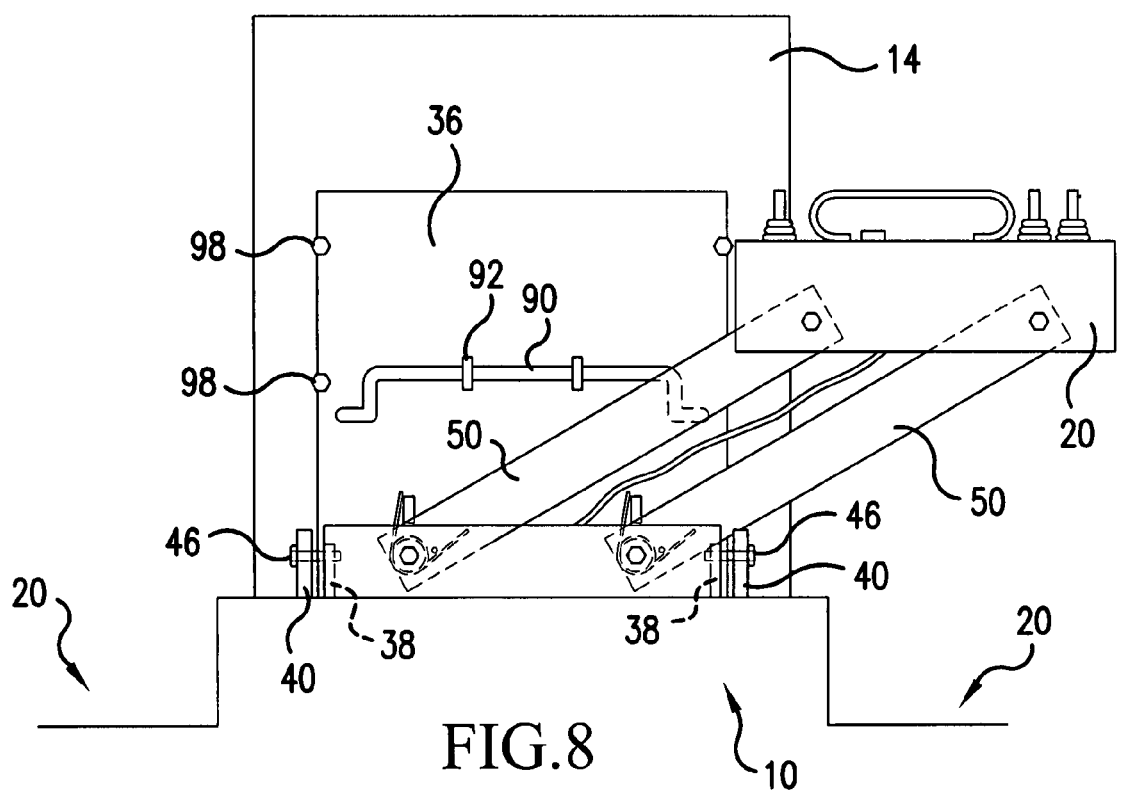
FIG. 8 is a front elevational view of the movable control console of FIG. 6 in a second use position.

The operation of console 16 will now be described primarily with reference to FIGS. 6-8 which illustrate the console 16 in a storage position (FIG. 6) and first and second use positions (FIGS. 7 and 8). In FIG. 6, console 16 is positioned such that legs 50 project generally perpendicularly from bottom wall 32 of base member 30 with fingers 70 positioned between ends 84 of springs 82 generally beneath tabs 80 and with cable or conduit 88 running from body 22 to an opening 96 in back panel 36. Crank arm 90 is positioned in the second or locking position with angled end portions 94 projecting away from back panel 36 and engaging protective plates 71 on the outer portions of the side walls 58 of legs 50 to hold legs 50 in this upright position. In this position, console 16 does not project from either side of truck 10 and is securely retained in position by crank arm 90.

Console 16 can be shifted to a first use position illustrated in FIG. 7 to allow an operator (not shown) standing on the operator support 20 at the left side of FIG. 7 to use the console 16 to control crane 12. To shift console 16 to this position, crank arm 90 is shifted to the first or unlocked position with angled end portions 94 against back panel 36. Body 20 or one of legs 50 is pulled to cause legs 50 to project over one end of base member 30 to move the console into the position illustrated. As legs 50 shift to the left in FIG. 7, fingers 68 engage one end 84 of each of springs 82, while the tabs 80 limit the angular movement of the other end of each spring, so that the springs 82 are coiled or uncoiled by the movement of the legs 50 and resist movement of the legs. The weight of body 22 and legs 50, however, is sufficient to hold console 16 in the position of FIG. 7 once it arrives at that position with the assistance of the operator. Movement of body portion 22 stops when the front and rear walls 54, 56 of one leg contact the front and rear walls 54, 56 of the other leg, or alternately, stops (not shown) may be provided to maintain a small separation between the first and second legs 50 when the console is in the first operating position. The legs 50 are approximately the same length and parallel so that the top wall 28 of body 22 remains substantially horizontal as the console tips into the position illustrated in FIG. 7. The C-shaped legs 50 also accommodate cables or conduits 88 (depending on whether electronic or hydraulic systems are being controlled) and allow the console to shift between the disclosed positions without pinching or crimping the cables and conduits. The above steps are reversed to return console 16 to the storage position, during which process the biasing force provided by the springs 82 allows the operator to more easily move the console to the center position of FIG. 6 without having to lift the entire weight of the console. The same steps are performed to shift the console to the second operation or use position illustrated in FIG. 8.

Figure 9:
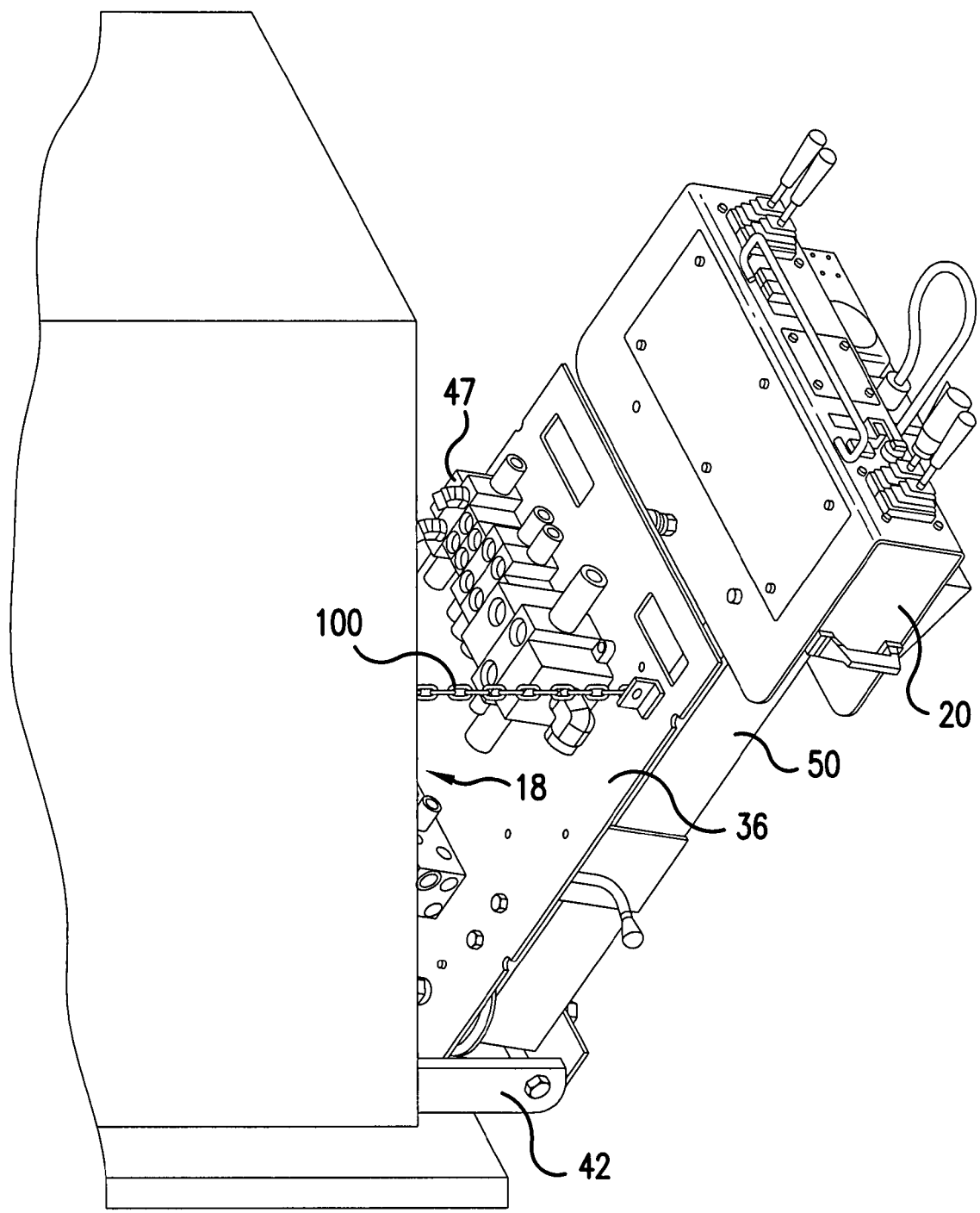
FIG. 9 is a perspective view of the movable control console of FIG. 1 in a maintenance configuration.

With reference to FIG. 9, control console 16 can be shifted from the storage position illustrated in FIG. 6 to a maintenance position illustrated in FIG. 9 to allow access to hydraulic connectors 47 and to opening 18 in crane housing 14. In order to shift console 16 to the maintenance position, the console 16 is moved to the position illustrated in FIG. 6 with body 22 centered above base 30, fasteners 98 are removed from housing 14, and console 16 is pivoted about the axis of bolts 46 near bottom wall 32 so that rear panel 36 moves away from the housing 14. A chain 100 connected between back panel 36 and housing 12 limits the distance console 16 can pivot away from opening 18. When maintenance is complete, console 16 is pivoted back about the axes of bolts 46 and refastened to housing 12.

Figure 10:
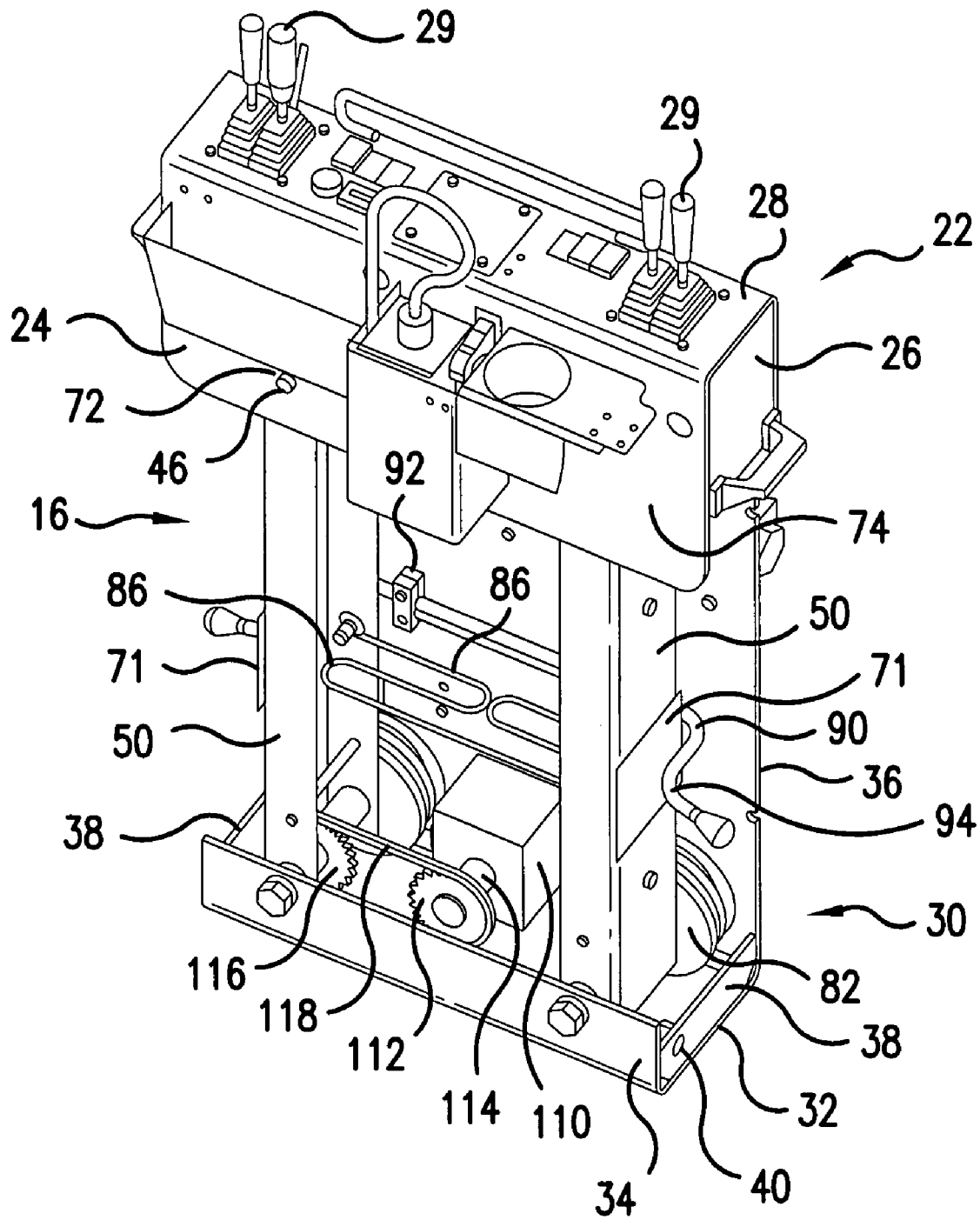
FIG. 10 is a front perspective view of a movable control console according to a second embodiment of the present invention.

A second embodiment of the present invention is illustrated in FIG. 10 wherein like reference numerals are used to identify elements common to the first embodiment. In this embodiment, a motor 110 is mounted on rear panel 36 which motor drives a first gear 112 mounted on motor output shaft 114. A second gear 116 is mounted on one of tubes 67 connecting the aligned openings in the front and rear walls of leg 50, and a drive chain 118 is connected between the first gear 112 and second gear 116. Springs 82 are illustrated in this embodiment, but may optionally be omitted. Using a controller (not shown) motor 110 can be driven to rotate first and second gears 112, 116 to apply torque to tube 67 to move console 16 among the three positions illustrated in FIGS. 6-8.

The present invention has been described herein in terms of illustrated preferred embodiments. Various modifications and additions to these embodiments will become apparent to those skilled in the relevant arts upon a reading of the foregoing disclosure. It is intended that all such modifications and additions comprise a part of the present invention to the extent they come within the scope of the several claims appended hereto.

I claim:

1. A control console comprising:
   a body supporting a plurality of controls;
   a base having first and second ends;
   a first leg having a first end pivotably connected to said body and a second end pivotably connected to said base;
   a second leg having a first end pivotably connected to said body and a second end pivotably connected to said base;
   said legs being shiftable between a first position projecting over said base first end, a second position projecting over said base second end and a third position between said first and second positions; and
   at least one spring biasing said legs toward said third position.

2. The control console of claim 1 wherein said base comprises a back panel and said at least one spring is mounted between said first leg and said back panel.

3. The control console of claim 2 wherein said back panel includes a tab, said at least one spring comprises a coil spring having a first end on a first side of said tab and a second end on a second side of said tab and said first leg includes a finger projecting toward said back panel and between said coil spring first and second ends.

4. The control console of claim 3 wherein said coil spring is mounted between said first leg second end and said back panel.

5. The control console of claim 1 wherein said base comprises a first base portion pivotably mounted on a second base portion for pivotable movement about a base pivot axis and wherein said first leg second end and said second leg second end are pivotably connected to said base first portion for pivotable movement about first and second leg pivot axes perpendicular to said base pivot axis.

6. A control console comprising:
   a body supporting a plurality of controls;
   a base having first and second ends;
   a first leg having a first end pivotably connected to said body and a second end pivotably connected to said base;
   a second leg having a first end pivotably connected to said body and a second end pivotably connected to said base;
   said legs being shiftable between a first position projecting over said base first end, a second position projecting over said base second end and a third position between said first and second positions; and
   a powered actuator operably connected to said first leg for shifting said legs among said first, second and third positions.

7. The control console of claim 6 wherein said base comprises a first base portion pivotably mounted on a second base portion for pivotable movement about a base pivot axis and wherein said first leg second end and said second leg second end are pivotably connected to said base first portion for pivotable movement about first and second leg pivot axes perpendicular to said base pivot axis.

8. The control console of claim 7 including biasing means biasing said legs toward said third position.

9. The control console of claim 7 including at least one spring biasing said legs toward said third position.

10. The control console of claim 6 including biasing means biasing said legs toward said third position.

11. The control console of claim 6 including at least one spring biasing said legs toward said third position.

12. The control console of claim 11 wherein said base comprises a back panel and said at least one spring is mounted between said first leg and said back panel.

13. The control console of claim 12 wherein said back panel includes a tab, said at least one spring comprises a coil spring having a first end on a first side of said tab and a second end on a second side of said tab and said first leg includes a finger projecting toward said back panel and between said coil spring first and second ends.

14. The control console of claim 13 wherein said coil spring is mounted between said first leg second end and said back panel.

15. A control console comprising:
   a body supporting a plurality of controls;
   a base having first and second ends and comprising a first base portion pivotably mounted on a second base portion for pivotable movement about a base pivot axis;
   a first leg having a first end pivotably connected to said body and a second end pivotably connected to said base about a first leg pivot axis perpendicular to said base pivot axis;
   a second leg having a first end pivotably connected to said body and a second end pivotably connected to said base about a second leg pivot axis perpendicular to said base pivot axis;
   said legs being shiftable between a first position projecting over said base first end, a second position projecting over said base second end and a third position between said first and second positions; and
   said first base portion being shiftable about said base pivot axis relative to said second base portion.

16. The control console of claim 15 further including a powered actuator operably connected to said first leg for shifting said legs among said first, second and third positions.

17. The control console of claim 15 wherein said base comprises a back panel and including a first coil spring mounted between said first leg second end and said back panel and a second coil spring mounted between said second leg second end and said back panel, said back panel including a first tab and a second tab, said first coil spring having a first end on a first side of said first tab and a second end on a second side of said first tab and said first leg includes a finger projecting toward said back panel and between said first coil spring first and second ends.

18. A control console comprising:
   a body supporting a plurality of controls;
   a base having first and second ends;
   a first leg having a first end pivotably connected to said body and a second end pivotably connected to said base;
   a second leg having a first end pivotably connected to said body and a second end pivotably connected to said base;
   said legs being shiftable between a first operation position projecting over said base first end whereat an operator may operate said controls, a second operation position projecting over said base second end whereat an operator may operate said controls, and a third position between said first and second positions; and
   at least one spring biasing said legs toward said third position.

19. The control console of claim 18 wherein said third position is a storage position.

* * * * *

UNITED STATES PATENT AND TRADEMARK OFFICE
Certificate

Patent No. 7,681,687 B2                                                          Patented: March 23, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Martin R. Stander, Greencastle, PA (US); Samuel K. Brown, Greencastle, PA (US); and Ryan M. Moose, Chambersburg, PA (US).

Signed and Sealed this Tenth Day of January 2012.

*PAUL N. DICKSON*
*Supervisory Patent Examiner*
*Art Unit 3616*
*Technology Center 3600*